United States Patent
Yoo et al.

(10) Patent No.: US 8,915,094 B2
(45) Date of Patent: Dec. 23, 2014

(54) REFRIGERATOR AND OPERATING METHOD THEREOF

(75) Inventors: Jae Yoo Yoo, Seoul (KR); Chang Oh Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1096 days.

(21) Appl. No.: 12/593,675

(22) PCT Filed: Mar. 29, 2008

(86) PCT No.: PCT/KR2008/001775
§ 371 (c)(1),
(2), (4) Date: Jan. 27, 2010

(87) PCT Pub. No.: WO2008/120928
PCT Pub. Date: Oct. 9, 2008

(65) Prior Publication Data
US 2010/0132385 A1  Jun. 3, 2010

(30) Foreign Application Priority Data
Mar. 31, 2007 (KR) .................. 10-2007-0032078

(51) Int. Cl.
*F25B 49/00* (2006.01)
*H02H 9/08* (2006.01)
*F25D 29/00* (2006.01)
*H02H 9/00* (2006.01)

(52) U.S. Cl.
CPC .............. *F25D 29/006* (2013.01); *H02H 9/001* (2013.01); *Y10S 323/908* (2013.01)
USPC ............ 62/228.1; 62/230; 323/908; 361/93.9

(58) Field of Classification Search
USPC ................ 62/228.1, 230; 323/908; 361/93.9; 388/934
See application file for complete search history.

(56) References Cited

U.S. PATENT DOCUMENTS

| | | | | |
|---|---|---|---|---|
| 5,570,277 A * | 10/1996 | Ito et al. | ........................... | 363/19 |
| 5,867,380 A * | 2/1999 | Lee | .................... | 363/98 |
| 6,356,468 B1 * | 3/2002 | Havukainen et al. | ........... | 363/49 |
| 6,744,612 B2 * | 6/2004 | Chen | .............................. | 361/58 |
| 7,218,495 B2 * | 5/2007 | Balakrishnan | ............... | 361/93.4 |
| 7,532,491 B2 * | 5/2009 | Lim et al. | ........................ | 363/34 |
| 2001/0043091 A1 * | 11/2001 | Hall et al. | ..................... | 327/108 |
| 2005/0126207 A1 * | 6/2005 | Lee et al. | ........................ | 62/408 |
| 2006/0033457 A1 * | 2/2006 | Won et al. | ..................... | 318/254 |

FOREIGN PATENT DOCUMENTS

| | | |
|---|---|---|
| JP | 04-229019 | 8/1992 |
| JP | 10-066253 | 3/1998 |
| KR | 10-0524726 | 10/2005 |

OTHER PUBLICATIONS

International Search Report dated Aug. 11, 2008.

* cited by examiner

*Primary Examiner* — Cassey D Bauer
*Assistant Examiner* — Steve Tanenbaum
(74) *Attorney, Agent, or Firm* — KED & Associates, LLP

(57) ABSTRACT

A bypass device of a refrigerator connected to an inrush current preventing device bypasses an input power when the input power is applied to the refrigerator, and a controller controls the input power input through the inrush current preventing device in response to a voltage measured by a voltage measuring device, recovers a function of the inrush current preventing device, and drives a compressor. Therefore, a standby time to re-drive the refrigerator is decreased and convenience is enhanced.

7 Claims, 4 Drawing Sheets

REFRIGERATOR AND OPERATING METHOD THEREOF

TECHNICAL FIELD

The present invention relates to a refrigerator and a method of operating the same, and more particularly, to a refrigerator in which an input power input to the refrigerator is bypassed to reduce a standby time when the refrigerator is re-operated and a method of operating the same.

BACKGROUND ART

In general, a refrigerator is an apparatus for storing food at a low temperature, in which food to be stored is frozen or refrigerated in accordance with the state of food to be stored. The chilled air supplied into the refrigerator is generated by the heat exchange of a refrigerant and is continuously supplied into the refrigerator while repeatedly performing a cycle of compression-condensation-expansion-evaporation. The supplied chilled air is uniformly spread to the inside of the refrigerator by convection so that food in the refrigerator can be stored at a desired temperature.

The refrigerator includes a compressor. The refrigerant is compressed by the compressor so that the chilled air is supplied to the inside of the refrigerator in accordance with the above-described cycle. The refrigerator rectifies and smoothes an electric power supplied from the outside and revolution per minute of the compressor is controlled in accordance with a change in load through an inverter. At this time, the refrigerator includes a unit for preventing an electric power supplied from the outside from breaking down or for preventing over current or over voltage from being generated to protect the compressor. In this case, in order to stop and then, re-operate the compressor, the compressor is to be re-operated after being stopped for a long time. When the compressor is stopped and then, immediately re-operated, the compressor can be damaged due to inrush current and the over voltage.

DISCLOSURE OF INVENTION

Technical Problem

In order to solve the above-described problems, it is an object of the present invention to provide a refrigerator capable of preventing a compressor from being damaged due to inrush current or over voltage and of preventing the refrigerator or the compressor from being stopped for a preset time when the refrigerator or the compressor is re-operated so that the refrigerator or the compressor is rapidly re-operated to improve convenience and a method of operating the same.

Technical Solution

In order to achieve the object, a refrigerator including a compressor for supplying chilled air into a refrigerator compartment and a freezer compartment, the refrigerator includes: an inrush current preventing unit for preventing an excessive current from being supplied when an input power is supplied to the refrigerator; a bypass unit connected to the inrush current preventing unit to bypass the input power; a voltage measuring unit for measuring a voltage of rectified and smoothed input power; and a controller for controlling the input power input through the inrush current preventing unit to bypass to the bypass unit in response to a magnitude of a voltage measured by the voltage measuring unit, for recovering an inrush current preventing function of the inrush current preventing unit, and for driving the compressor.

In order to achieve the object, a method of operating a refrigerator includes: inputting an input power through an inrush current preventing unit and rectifying and smoothing the same; measuring a voltage of the smoothed input power; and controlling a bypass unit connected to the inrush current preventing unit such that the input power is bypassed when the measured voltage is greater than a reference voltage, and driving a compressor.

Advantageous Effects

In the refrigerator according to the present invention and the method of operating the same, in the case where the compressor can be operated after the compressor is initially driven, a power input through the inrush current preventing unit is bypassed. Therefore, the inrush current cannot be prevented due to the resistance of the inrush current preventing unit when the compressor is re-driven. As a result, it is possible to prevent the compressor from erroneously operating or being damaged so that the stability and reliability of a product is improved and to reduce a standby time in accordance with the re-driving of the compressor so that the convenience of a user is improved.

BEST MODE FOR CARRYING OUT THE INVENTION

Hereinafter, embodiments of the present invention will be described with reference to the accompanying drawings.

Figure 1:
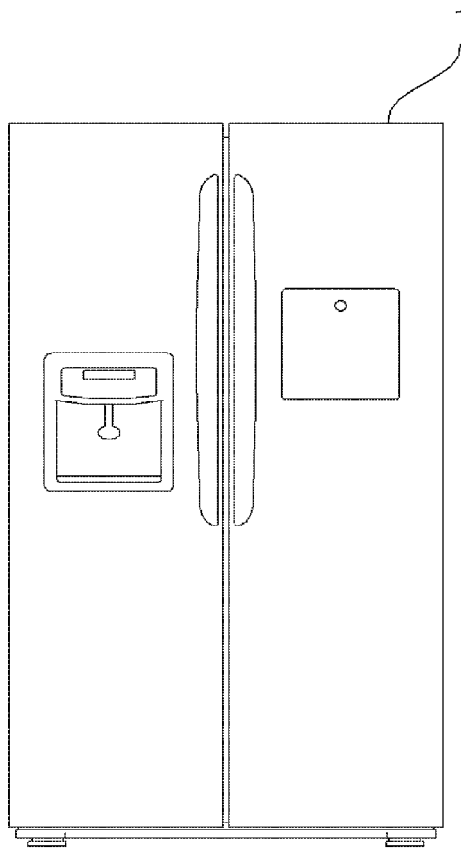
FIG. 1 illustrates a refrigerator according to an embodiment of the present invention.

FIG. 1 illustrates a refrigerator according to an embodiment of the present invention.

As illustrated in FIG. 1, a refrigerator 1 includes a freezer compartment and a refrigerator compartment. A plurality of compressors for cooling the freezer compartment and the refrigerator compartment, evaporators, heaters for defrosting the evaporators, and blowing fans are provided to correspond to the number of freezer and refrigerator compartments. In addition, the refrigerator includes a plurality of temperature sensors for sensing the internal temperatures of the refrigerator compartments and the freezer compartments and measuring a temperature of ambient air, an input unit to which refrigerating and freezing sets are input, and a controller for controlling the refrigerator in accordance with the input sets.

The controller drives the compressors, the evaporators, the heaters, and the blowing fans so that the chilled air is supplied to the freezer compartments and the refrigerator compartments in accordance with the input sets to control the operation of the controller in accordance with temperatures input through the plurality of temperature sensors.

Figure 2:
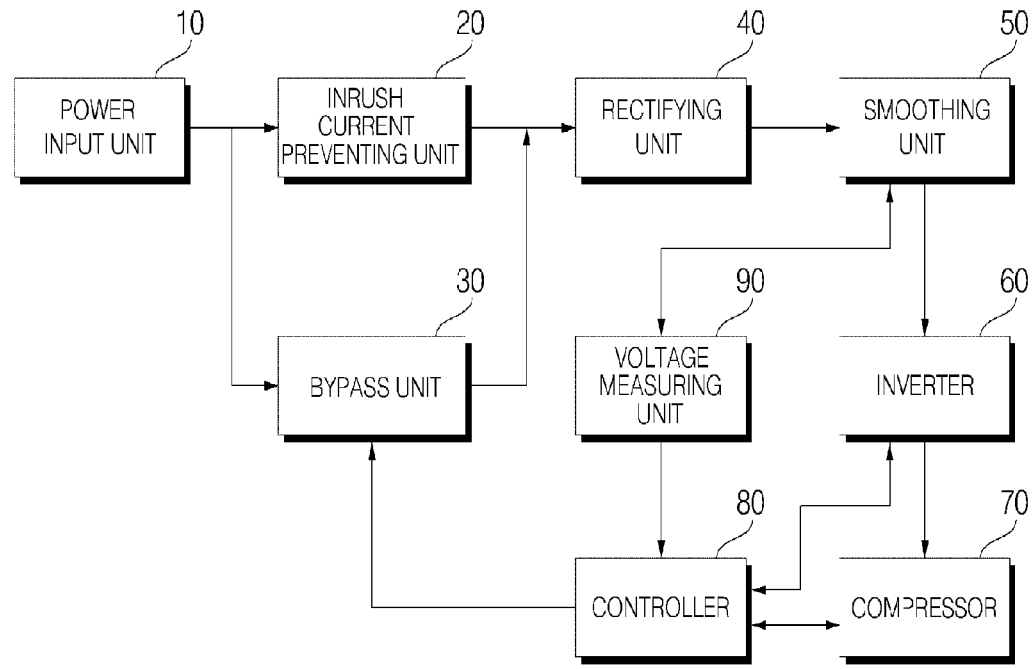
FIG. 2 is a block diagram illustrating the structure of the refrigerator according to an embodiment of the present invention.

FIG. 2 is a block diagram illustrating the structure of the refrigerator according to an embodiment of the present invention.

In addition, as illustrated in FIG. 2, the refrigerator 1 includes a power input unit 10, an inrush current preventing unit 20, a bypass unit 30, a rectifying unit 40, a smoothing unit 50, a voltage measuring unit 90, a compressor motor 70, and an inverter 60. In this case, the controller 80 controls an input power applied from the power input unit 10 to be converted through the rectifying unit 40, the smoothing unit 50, and the inverter 60 and to be supplied to the compressors, the evaporators, the heaters, and the blowing fans. Hereinafter, the structure that makes the subject matter of the present invention vague will be omitted from the drawings and the detailed description.

The inrush current preventing unit 20 is connected to the power input unit 10 that receives an alternate current (AC) power from the outside to delay that an electric power source is applied to the respective parts for a predetermined time, to prevent over voltage or inrush current from being instantaneously input, and to prevent an erroneous operation and damage from being generated. At this time, an input power is applied to the inrush current preventing unit 20 and electric current flows so that a resistance is reduced, that a function of preventing the inrush current is reduced. When the electric current is decreased, the resistance increases and the function of preventing the inrush current is recovered.

The bypass unit 30 is connected parallel to the inrush current preventing unit 20 to be operated by a control command from the controller 80 and to bypass the electric power such that the AC power supplied from the power input unit 10 is applied to the rectifying unit 40. In a case where the refrigerator 1 is early operated, when the electric power is input through the power input unit 10, the bypass unit 30 is not operated. After a predetermined time has elapsed, the bypass unit 30 is operated by the control signal of the controller 80 such that the electric power applied to the rectifying unit 40 through the inrush current preventing unit 20 is bypassed and is supplied to the rectifying unit 40.

The rectifying unit 40 performs full wave rectification or half wave rectification to the AC power and applied the rectified power to the smoothing unit 50. The smoothing unit 50 converts the rectified power into a direct current voltage with a predetermined voltage by smoothing the rectified power.

The inverter 60 re-converts the power converted into the DC power by the smoothing unit 50 into the AC power and applies the converted AC power to the compressor motor 70 such that the compressor is driven. In this case, the inverter 60 is operated according to a switching signal applied from the controller 80 and generates an AC power to drive the compressor motor 70.

The voltage measuring unit 90 is connected to the smoothing unit 50 to measure a voltage of the smoothing unit and to apply the measured voltage to the controller 80.

The controller 80 applies a control command to the bypass unit 30 in correspondence with the voltage measured by the voltage measuring unit 90. Moreover, the controller, as described above, creates the switching signal and applies the same to the inverter 60. The controller 80 is connected to a plurality of sensors to monitor an operating state of the compressor motor 70, to create the switching signal corresponding to the monitored operating state, to apply the switching signal to the inverter 60 such that the compressor motor 70 is controlled.

The controller 80, when the voltage of the smoothing unit 50 input from the voltage measuring unit 90 is equal to or higher than a preset reference voltage, controls the bypass 30 to be switched. By doing so, the power of the power input unit 10 is applied to the rectifying unit 40 through the bypass unit 30. When the input power is supplied through the bypass unit 30, the controller 80 decreases current supplied to the inrush current preventing unit 20 such that the function of preventing inrush current of the inrush current preventing unit 20 is recovered.

In this case, the controller 80, when the refrigerator is stopped after a predetermined time has elapsed, and controls the refrigerator is immediately re-operated by a re-operating command.

Figure 3:
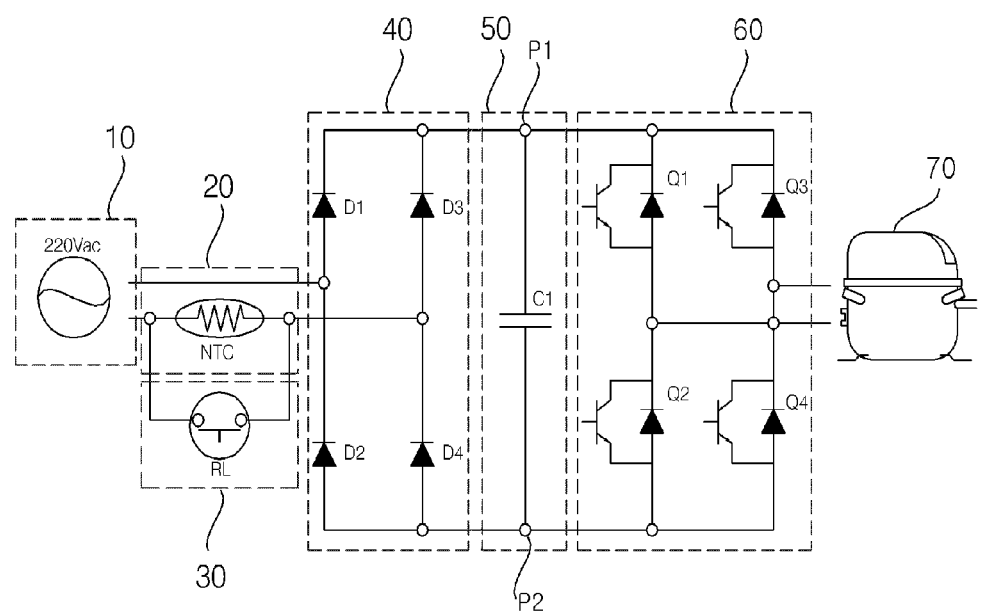
FIG. 3 is a circuit diagram illustrating a circuit of the refrigerator according to an embodiment of the present invention.

FIG. 3 is a circuit diagram illustrating a circuit of the refrigerator according to an embodiment of the present invention.

As shown in FIG. 3, the inrush current prevent unit 20 includes at least variable resistor or a negative temperature coefficient thermistor (NTC). The NTC has resistance varied as temperature is changed such that the resistance decreases when temperature increases and decreases when temperature decreases.

The bypass unit 30 includes a switching device RL connected parallel to both ends of the NTC of the inrush current preventing unit 20. The switching device RL of the bypass unit 30 is switched on or off according to the control command from the controller 80. Since high AC voltage is directly applied from the power input unit 10, a high voltage switching device is preferably used as the switching device. In the present invention, a high voltage relay is used as the switching device.

When the refrigerator is early operated, the NTC of the inrush current preventing unit 20 has a high resistance early. When the AC power is input through the power input unit 10, a small quantity of electric current is applied to the rectifying unit 40 due to the high resistance, and the power is supplied to the rectifying unit 40 and the smoothing unit 50. Due to the voltage supplied to the NTC, the NTC is heated and temperature thereof increases so that the resistance is gradually decreased as temperature increases.

When a predetermined time has elapsed after the early operation, the resistance of the NTC of the inrush current preventing unit 20 is decreased and the input power is supplied to the rectifying unit 40. The voltage applied to the rectifying unit 40 is rectified through the full wave rectification or the half wave rectification by a plurality of diodes of the rectifying unit 40, and first to fourth diodes D1, D2, D3, and D4 and is applied to the smoothing 50.

The smoothing 50 includes at least one capacitor and the power rectified by the rectifying unit 40 is smoothed by a first capacitor C1 and is converted into an AC power of a predetermined level.

In this case, the voltage measuring unit 90, after the early operation, is connected to both ends of the first capacitor C1, that is, a first position P1 and a second position P2 to continuously measure a voltage applied to the first capacitor C1.

When the voltage of the both ends of the first capacitor C1, input from the voltage measuring unit 90, is greater than the preset reference voltage, the controller 80 creates a control command of conducting the bypass unit 30 and applies the control command to the relay RL of the bypass unit 30.

In this case, the reference voltage with respect to the voltage at the both ends of the first capacitor C1 is set as a voltage where the compressor motor 70 is normally driven. Therefore, when the voltage measured by the voltage measuring unit 90 is greater than the reference voltage, the controller 80 controls the bypass unit 30 as described above and creates a switching signal of controlling the inverter 60 and applies the switching signal to the inverter to drive the compressor motor 70.

The relay RL of the bypass unit 30 is switched on by the control command of the controller 80 and the AC power of the power input unit 10 is applied to the rectifying unit 40 through the bypass unit 30. When the bypass unit 30 is conducted, since the resistance of the bypass unit 30 is less than the resistance of the NTC of the inrush current preventing unit 20, the input power of the power input unit 10 is bypassed and supplied to the rectifying unit 40 through the bypass unit 30.

Therefore, a small quantity of current flows through the NTC of the inrush current preventing unit 20. Temperature decreases as heat decreases so that the resistance increases.

In a case where the resistance of the NTC of the inrush current preventing unit 20 increases as described above, when the refrigerator or the compressor is re-operated after stopping, the refrigerator or the compressor can be immediately re-operated without standby until the resistance of the inrush current preventing unit 20 increases.

Figure 4:
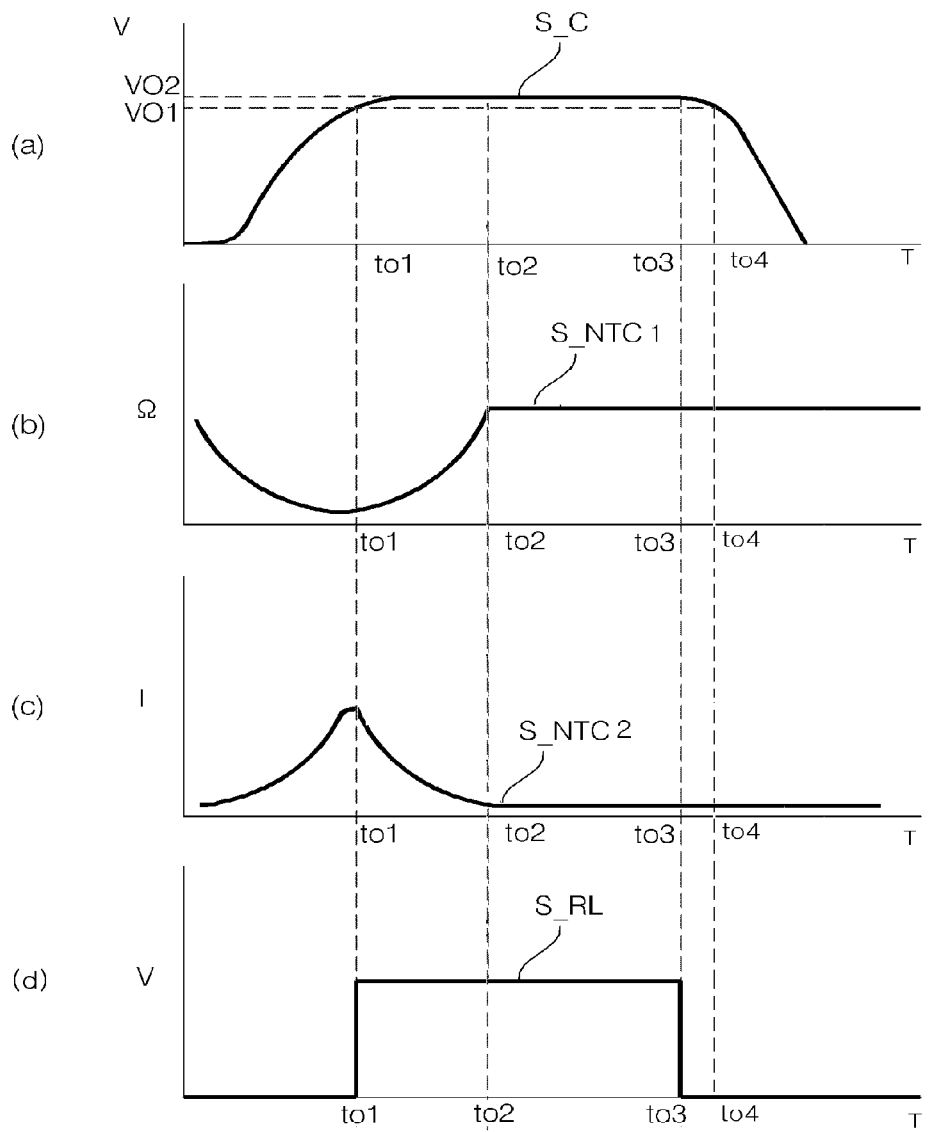
FIG. 4 illustrates changes in the voltage, the resistance, and the current of the parts of the refrigerator according to an embodiment of the present invention.

FIG. 4 illustrates changes in the voltage, the resistance, and the current of the parts of the refrigerator according to an embodiment of the present invention.

In FIG. 4, (a) shows a voltage (S_C) applied to both ends of the first capacitor C1, (b) shows variation (S_NTC1) of the resistance of the NTC of the inrush current preventing unit 20, (c) shows current (S_NTC2) applied to the NTC, and (d) shows a signal (S_RL) of controlling the switching device of the bypass unit 30.

Referring to (b) of FIG. 4, the resistance of the NTC is high at the early operation heat is generated when a predetermined voltage is applied due to the input power of the power input unit 10 so that temperature increases. As temperature increases, the resistance of the NTC decreases.

As shown in (c) of FIG. 4, the current applied to the rectifying unit 40 through the NTC increases as the resistance of the NTC decreases.

Therefore, as shown in (a) of FIG. 4, the voltage at both ends of the first capacitor C1 of the smoothing unit 50 increases, and the controller 80 applies a control signal at a first time (to1) when a voltage reaches to a reference voltage (VO1) such that the relay RL of the bypass unit 30 is operated as shown in (d) of FIG. 4.

When the relay RL is operated at the first time (tot) and the input power of the power input unit 10 is bypassed through the bypass unit 30 and is supplied to the rectifying unit 40, the current applied to the NTC of the inrush current preventing unit 20 decreases and the resistance increases as shown in (b) of FIG. 4. As the resistance of the NTC increases and temperature becomes constant at a second time (to2), the resistance has a constant value. At this time, although the refrigerator or the compressor is re-operated, the NTC has a high resistance and prevents the inrush current.

Here, when the refrigerator or the compressor is not re-operated but the refrigerator or the compressor is stopped during the operation for a predetermined time, the controller 80 stops the relay RL of the bypass unit 30. In this case, the first capacitor C1 of the smoothing unit 50 is discharged. Until the first capacitor C1 is discharged under a reference value, the refrigerator or the compressor is not re-operated but stands by and is preferably re-operated after a fourth time (to4). Here, the voltage of the first capacitor C1 of the smoothing unit 50 shown in (a) of FIG. 4 shows an approximate voltage recharged and discharged by the operation of the bypass unit 30 although the first capacitor C1 is recharged and discharged for second time (to2) to a third time (to3) repeatedly in accordance with its operation is recharged and discharged and due to this a voltage ripple is generated.

Operation of the present invention constructed as described above will be described.

Figure 5:
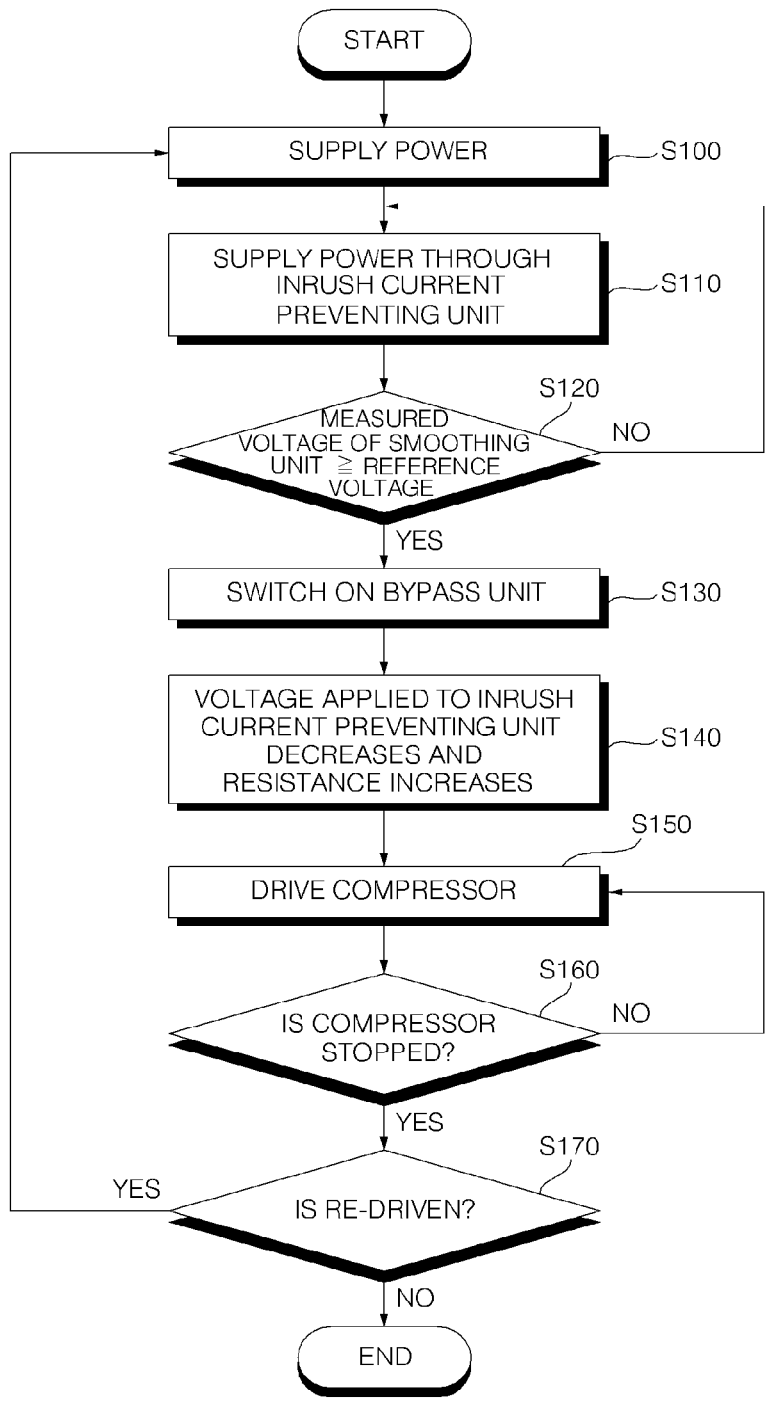
FIG. 5 is a flowchart illustrating a method of operating the refrigerator according to an embodiment of the present invention.

FIG. 5 is a flowchart illustrating a method of operating the refrigerator according to an embodiment of the present invention.

As illustrated in FIG. 5, when the refrigerator is early operated, the input power is converted through the rectifying unit 40, the smoothing unit 50, and the inverter 60 to be supplied (S100).

In this case, the input power is a high AC voltage, and is applied to the rectifying unit 40 through the NTC of the inrush current preventing unit 20 to be rectified. Since the NTC of the inrush current preventing unit 20 has a high resistance at the early operation of the refrigerator, the input power with a small quantity of current flows through the NTC (S110). As the input power is applied to the NTC and current flows therethrough, heat is generated due to a resistance component and temperature increases. The resistance decreases in inverse proportion to the increased temperature. Due to this, the current flowing through the inrush current preventing unit 20 increases in inverse proportion to the resistance and predetermined quantity of current is applied to the rectifying unit 40.

The power rectified through the rectifying unit 40 is applied to the smoothing unit 50, and the first capacitor C1 of the smoothing unit 50 repeats the recharge and discharge to convert the input power into a DC power with a predetermined voltage. After the early operation, the voltage at the both ends of the first capacitor C1 is gradually increased and maintains a constant voltage after a predetermined time has elapsed.

The voltage measuring unit 90 measures a voltage applied to the both ends of the first capacitor C1 and applies the same to the controller 80. The controller 80 compares the measured voltage with the reference voltage (S120), and controls the bypass unit 30 to be operated when the measured voltage is greater than the reference voltage (S130).

In the bypass unit 30, the switching device, that is, the relay RL is switched on according to the control signal of the controller 80 such that the current flows through the relay RL and the input power is bypassed.

Therefore, the input power of the power input unit 10 is supplied to the rectifying unit 40 through the bypass unit 30 and current supplied to the inrush current preventing unit 20 is decreased. In this case, heat generated in the NTC of the inrush current preventing unit 20 decreases as the current decreases, and the resistance increases in inverse proportion to that (S140).

When the voltage of the first capacitor C1 of the smoothing unit 50 is greater than the reference voltage, the controller 80 determines whether the voltage is as high as to drive the compressor motor 70 and applies a switching control signal to the inverter 60 to be operated. Since the inverter 60 is operated by the switching control signal of the controller 80, the DC power output from the smoothing unit 50 is converted into the AC power by the inverter 60 and is supplied to the compressor motor 70 to be operated (S150).

When the compressor is driven, the chilled air is supplied into the refrigerator compartments and the freezer compartments and the refrigerator is normally operated. When the controller 80 controls the compressor motor 70 in response to temperatures of the refrigerator compartments and the freezer compartments, the compressor is stopped when the temperatures are higher than a preset temperature.

When the compressor is re-driven (S170) after the compressor is stopped (S160), the controller 80, as described above, controls the input power to be converted through the rectifying unit 40, the smoothing unit 50, and the inverter 60 and applied as a driving power to the compressor motor 70. In this case, the controller 80 controls the compressor to be re-driven without a standby time for the re-driving of the compressor.

As described with reference to FIG. 4, when the compressor is driven over the second time (to2) after the early operation, the compressor may be immediately re-driven without the standby time under a condition where the first capacitor C1 is discharged under a reference value (to3 to4). However, when the compressor is stopped immediately after the driving of the compressor motor, for example when the compressor is stopped before the second time (to2), the compressor preferably stands by until (to2) the resistance of the NTC increases and reaches to a predetermined value.

Although a refrigerator and a method of operating the same according to the present invention have been described with reference to the embodiment shown in the drawings, these are merely illustrative, and those skilled in the art will understand that various modifications and equivalent other embodiments of the present invention are possible. Consequently, the true technical protective scope of the present invention must be determined based on the technical spirit of the appended claims.

INDUSTRIAL APPLICABILITY

According to a refrigerator and a method of operating the same according to the present invention, an electric power input through an inrush current preventing unit is bypassed such that the inrush current preventing unit is recovered to its original state. Therefore, when the refrigerator is needed to be re-operated, the refrigerator may be immediately re-operated without standby time. The inrush current preventing unit is prevented from malfunctioning when the refrigerator is re-operated. Moreover, since the compressor is prevented from malfunctioned and being lost, stability and reliability of products can be improved.

The invention claimed is:

1. A refrigerator comprising a compressor that supplies chilled air into a refrigerator compartment and a freezer compartment, the refrigerator comprising:
    one of a variable resistor or a negative temperature coefficient thermistor that prevents an excessive current from being supplied when an input power is supplied to the refrigerator;
    a bypass switch connected to one of the variable resistor or the negative temperature coefficient thermistor to bypass the input power;
    a voltage measuring device that measures a voltage of rectified and smoothed input power;
    an inverter that re-converts the rectified and smoothed input power into AC power and applies the converted AC power to the compressor; and
    a controller that controls the input power input through one of the variable resistor or the negative temperature coefficient thermistor to bypass to the bypass switch when the voltage measured by the voltage measuring device is greater than a reference voltage, and creates a switching signal for controlling the inverter and applies the switching signal to the inverter, when the voltage measured by the voltage measuring device is greater than the reference voltage, to recover an inrush current preventing function of one of the variable resistor or the negative temperature coefficient thermistor, and to drive the compressor, wherein when a re-driving command from the controller to the compressor is input after the compressor is driven for a predetermined time period and is stopped, the controller controls the compressor to re-drive immediately, so that the refrigerator immediately re-operates, wherein a resistance of one of the variable resistor or the negative temperature coefficient thermistor decreases due to heat generated when an electric power is applied, and increases as the heat decreases when the electric power is not applied or current of the applied electric power decreases, wherein when the input power is bypassed, the current flowing through one of the variable resistor or the negative temperature coefficient thermistor decreases or does not flow so that the resistance of one of the variable resistor or the negative temperature coefficient thermistor increases and the inrush current preventing function of one of the variable resistor or the negative temperature coefficient thermistor recovers, and wherein the reference voltage is set as a predetermined operational voltage for driving the compressor motor.

2. The refrigerator of claim 1, wherein the bypass switch comprises a relay connected parallel to both ends of the one of the variable resistor or the negative temperature coefficient thermistor.

3. The refrigerator of claim 1, wherein the voltage measuring device is connected to both ends of a capacitor that smoothes the rectified input power to measure the voltage.

4. A method of operating a refrigerator, comprising:
    inputting an input power through one of the variable resistor or the negative temperature coefficient thermistor and rectifying and smoothing the same;
    measuring a voltage of the smoothed input power;
    re-converting the rectified and smoothed input power into AC power and applying the converted AC power to a compressor;
    controlling a bypass switch connected the one of the variable resistor or the negative temperature coefficient thermistor such that the input power is bypassed when the measured voltage is greater than a reference voltage, and creating a switching signal for controlling an inverter and applying the switching signal to the inverter and driving the compressor; and
    re-driving the compressor immediately when a re-driving command is input after the compressor is driven for a predetermined time period and is stopped, wherein when the input power is bypassed, a current flowing through the one of the variable resistor or the negative temperature coefficient thermistor decreases or does not flow so that a resistance of one of the variable resistor or the negative temperature coefficient thermistor increases and an inrush current preventing function of one of the variable resistor or the negative temperature coefficient thermistor recovers.

5. A refrigerator comprising a compressor that supplies chilled air into a refrigerator compartment and a freezer compartment, the refrigerator comprising:
    one of a variable resistor or a negative temperature coefficient thermistor that prevents an excessive current from being supplied when an input power is supplied to the refrigerator;
    a bypass switch connected to one of a variable resistor or a negative temperature coefficient thermistor to bypass the input power;
    a voltage measuring device that measures a voltage of rectified and smoothed input power;

an inverter that re-converts the rectified and smoothed input power into the AC power and applies the converted AC power to the compressor; and a controller that controls the input power input through one of a variable resistor or a negative temperature coefficient thermistor to bypass to the bypass switch when the voltage measured by the voltage measuring device is greater than a reference voltage, and creates a switching signal for controlling the inverter and applies the switching signal to the inverter, when the voltage measured by the voltage measuring device is greater than the reference voltage, to recover an inrush current prevention function of one of a variable resistor or a negative temperature coefficient thermistor, and to drive the compressor, wherein when a re-driving command from the controller to the compressor is input after the compressor is driven for a predetermined time period and is stopped, the controller controls the compressor to re-drive immediately, so that the refrigerator immediately operates, wherein the bypass switch comprises a relay connected parallel to both ends of one of a variable resistor or a negative temperature coefficient thermistor, and wherein the voltage measuring device is connected to both ends of a capacitor that smoothes the rectified input power to measure the voltage.

6. The refrigerator of claim 1, further comprising:

a rectifying device that rectifies the input power into full wave rectification or half wave rectification; and a smoothing device that smooths the rectified power into a direct current voltage with predetermined voltage.

7. The refrigerator of claim 6, wherein the rectifying device includes four diodes.

* * * * *